US006567663B1

(12) United States Patent
Otting et al.

(10) Patent No.: US 6,567,663 B1
(45) Date of Patent: May 20, 2003

(54) METHOD FOR CONTINUOUS HOME PUBLIC LAND MOBILE NETWORK SEARCH

(75) Inventors: Marcia Jean Otting, Mundelein, IL (US); Charles Philipp Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/332,265

(22) Filed: Jun. 11, 1999

(51) Int. Cl.⁷ ................................................. H04Q 7/20
(52) U.S. Cl. .................... 455/434; 455/432; 455/161.3; 455/166.1
(58) Field of Search ............................... 455/432, 434, 455/435, 67.1, 161.1, 161.2, 161.3, 166.1, 166.2, 185.1, 186.1, 515

(56) References Cited

U.S. PATENT DOCUMENTS

| | | | |
|---|---|---|---|
| 4,905,301 A | * | 2/1990 | Krolopp et al. ............. 455/434 |
| 5,442,806 A | | 8/1995 | Barber et al. |
| 5,444,765 A | * | 8/1995 | Marui et al. ................ 455/432 |
| 5,504,803 A | | 4/1996 | Yamada et al. |
| 5,953,665 A | * | 9/1999 | Mattila ........................ 455/434 |
| 6,026,300 A | * | 2/2000 | Hicks .......................... 455/434 |
| 6,075,988 A | * | 6/2000 | Anderson et al. ......... 455/161.1 |
| 6,108,542 A | * | 8/2000 | Swanchara et al. ......... 455/434 |
| 6,173,181 B1 | * | 1/2001 | Losh ........................... 455/434 |

FOREIGN PATENT DOCUMENTS

| | | |
|---|---|---|
| GB | 2257334 | 1/1993 |

* cited by examiner

*Primary Examiner*—Lester G. Kincaid
(74) *Attorney, Agent, or Firm*—Lalita P. Pace; Shigeharu Furukawa

(57) ABSTRACT

In a mobile station (MS) of a cellular radiotelephone system, a method of searching for the MS's home public land mobile network (HPLMN) when the MS is camped on a non-HPLMN. The method is performed in thirty second intervals while the MS is already in its receive ready (higher current-drawing) state. The method performs strategic measurements of the receive signal level in order to determine if it is likely that the HPLMN has become available again. If the probability is high that the HPLMN has become available, further data is gathered on the likely available channel. Once the channel is identified, the MS begins the camping procedure to register on the HPLMN.

13 Claims, 5 Drawing Sheets

METHOD FOR CONTINUOUS HOME PUBLIC LAND MOBILE NETWORK SEARCH

FIELD OF THE INVENTION

The present invention relates generally to the field of communication systems, and more particularly to methods of searching for the Home Public Land Mobile Network (HPLMN) in a radiotelephone system. Although the invention can be used in a wide range of applications, it is described in connection with a GSM cellular telephone.

BACKGROUND OF THE INVENTION

A GSM cellular telephone or mobile station (MS) operates with a subscriber identity module (SIM) card that specifies the MS's HPLMN. From both a user's and a cellular service provider's (CSP) perspective, it is desirable for the MS to be operating in the HPLMN. The user does not incur additional charges, such as roaming charges, when the MS operates in the HPLMN. The CSP earns more revenue when the MS is operating in the HPLMN.

During times when the MS is not operating in the HPLMN, the GSM ETSI specifications provide a mechanism for the MS to periodically search for the HPLMN. The mechanism utilizes a HPLMN search timer. The timeout value is configurable by the CSP and resides on the SIM card. The timeout value is set to a value in six minute increments and specifies how often the MS should search for the HPLMN. FIG. 7 is a flow chart that illustrates a known method of searching for the HPLMN. At the start of the method, the MS is camped on a non-HPLMN. In block 702, the MS is in its lowest power state. In block 704, the HPLMN search timer is set to expire in six minutes. In decision block 706, the method determines whether the timer has expired. If no, the method continues to check until the timer has expired. When the timer expires, a full search for the HPLMN is performed (block 708). A full search includes the steps of measuring the RF carrier level on every frequency supported by the MS, finding carriers of a suitable level, reading broadcast information on the suitable carriers and determining if the carriers are in the HPLMN. Next, the method determines whether the HPLMN is found. If no, the MS returns to its lowest power state. If yes, camping procedures on the HPLMN are initiated (block 710) by first searching for the strongest available channel of the HPLMN and then by registering the MS on the HPLMN.

A limitation of the above method is that the timeout value of the HPLMN search timer can be too long. Six minutes may be inadequate, in certain instances, to find the HPLMN soon after it becomes available. For example, if a user moves out of the MS's HPLMN coverage area and quickly returns to the HPLMN coverage area, the user must wait until the HPLMN search timer expires before the MS will attempt to find the HPLMN. Another limitation of the above method is that once the HPLMN search is initiated, it can take up to two minutes to complete. The lengthy completion time can be attributed to the search consisting of taking receive signal level measurements on every channel that the MS is capable of accessing, synchronizing to suitable channels and reading broadcast data on those channels until a channel of the HPLMN is found.

Another method of finding the HPLMN allows the user to manually search for the HPLMN by navigating through a series of menus and then initiating a search for the HPLMN. Like the previously described method, this method also has a lengthy completion time. In addition, the user needs to be aware of when the HPLMN becomes available before initiating the search. If a search is initiated before the HPLMN is available, the search will prove unsuccessful and unnecessarily drain the MS's current.

The limitations of the previously discussed methods of searching for the HPLMN could be overcome by implementing a method that continuously searches for the HPLMN. However, such an activity would cause the battery life of the MS to be significantly reduced. The process of a continuous search takes additional processor cycles and causes the internal components of the MS to be in their receive ready (higher current-drawing) state.

Therefore, there exists a need for a method of searching for the HPLMN that strikes a compromise between a continuous search that drains the resources of the MS and a long-interval search, that is too slow for desirable operation.

SUMMARY OF THE PREFERRED EMBODIMENT

The present invention provides an improvement over the long-interval search of the prior art. The HPLMN search method of the present invention utilizes specific times when the internal components of the MS are already in their receive ready (higher current-drawing) state and performs strategic receive signal level measurements to determine whether it is likely that the HPLMN has become available again. If the probability that the HPLMN has become available is high, further data is gathered on the likely available channel to confirm that the HPLMN has in fact become available. Then the MS can begin the camping procedure on the HPLMN.

In a mobile station, the preferred embodiment of the method of searching for a home public land mobile network comprises the steps of reading first broadcast data on a serving cell; measuring a receive power level of a plurality of channels on a first broadcast allocation list to produce a plurality of receive power level measurements; for each of the plurality of channels, until the home public land mobile network is found, determining whether the receive power level measurement is adequate; determining whether the receive power level measurement is strong enough to synchronize to the channel if the receive power level measurement is adequate; reading second broadcast data from the channel if the receive power level measurement is strong enough to synchronize to the channel, wherein the second broadcast data includes a public land mobile network and a second broadcast allocation list; determining whether the public land mobile network identified in the second broadcast data matches the home public land mobile network; and initiating camping on the home public land mobile network using the second broadcast allocation list when the public land mobile network matches the home public land mobile network.

Additional advantages and novel features of the invention will be set forth in part in the description which follows, wherein the preferred embodiment of the invention is shown and described. Reference will now be made in detail to an embodiment configured according to the present invention.

DESCRIPTION OF THE PREFERRED EMBODIMENTS

Figure 1:
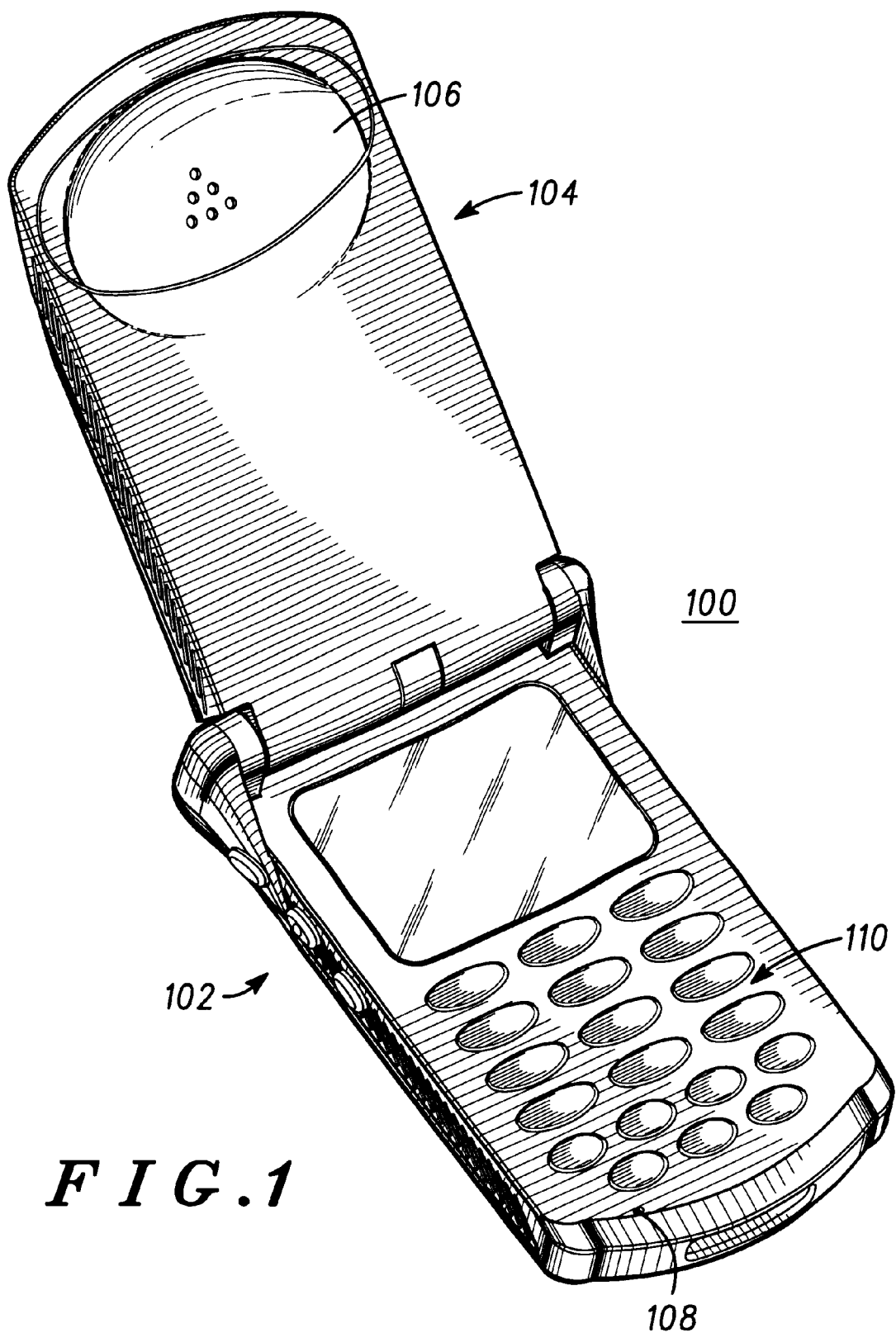
FIG. 1 is a perspective view of a cellular telephone that can implement the preferred embodiment of the method of the present invention.

FIG. 1 depicts an MS that can utilize the method of the present invention. The MS 100 has two portions, a body 102 and a cover 104. FIG. 1 shows cover 104 in an open position such that a user of the MS 100 can listen via earpiece 106 and speak into microphone 108. The body 102 includes a keypad 110 having a plurality of buttons numbered one through zero, #, and *, in a conventional telephone arrangement. The keypad 110 may also have additional buttons such as power, function, send, and other buttons associated with telephone number recall. The body 102 also has an antenna 202 (FIG. 2) that enables wireless communication between MS 100 and base station (not shown) of the cellular radiotelephone system.

Figure 2:
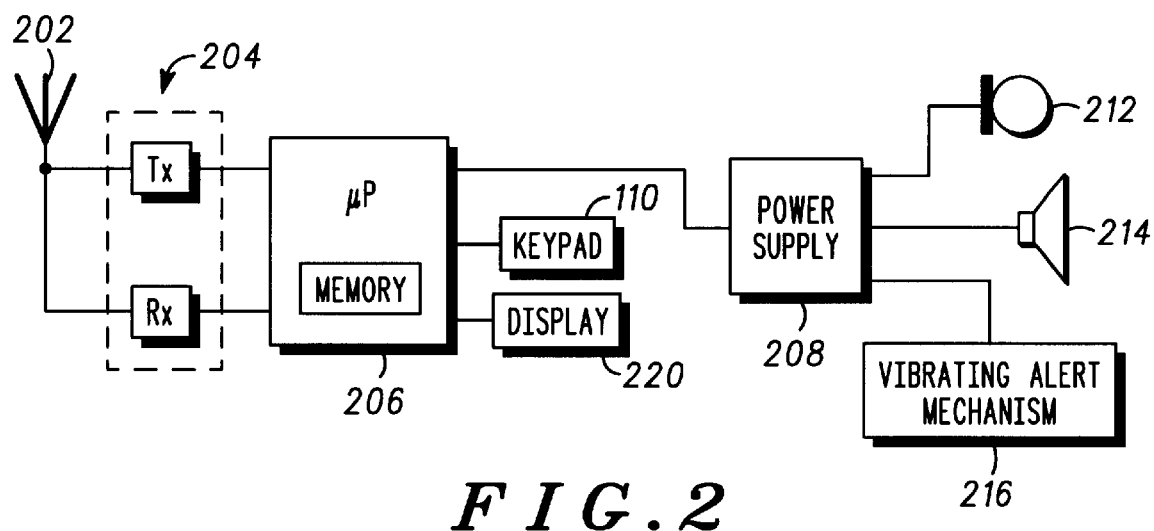
FIG. 2 is a block diagram of the MS of FIG. 1.

Referring to FIG. 2, a block diagram of the MS 100 of FIG. 1 is shown. The MS 100 includes an antenna 202, a transceiver 204, a microprocessor 206, a power supply IC 208, a microphone 212, a speaker 214, a vibrating alert mechanism 216, a keypad 110 and a display 220. The antenna 202 receives signals from and transmits signals to the transceiver 204. These signals are sent to the microprocessor 206 for processing. The microprocessor 206 also processes inputs from the keypad 110 and outputs to the display 220. Preferably, the microprocessor 206 is a 32-bit general purpose microprocessor available from many sources. The remainder of the circuitry shown in FIG. 2 can be implemented using commonly available components known in the art. The components should be chosen such that they can be controlled to alternate between their high power and low power standby modes.

Figure 3:
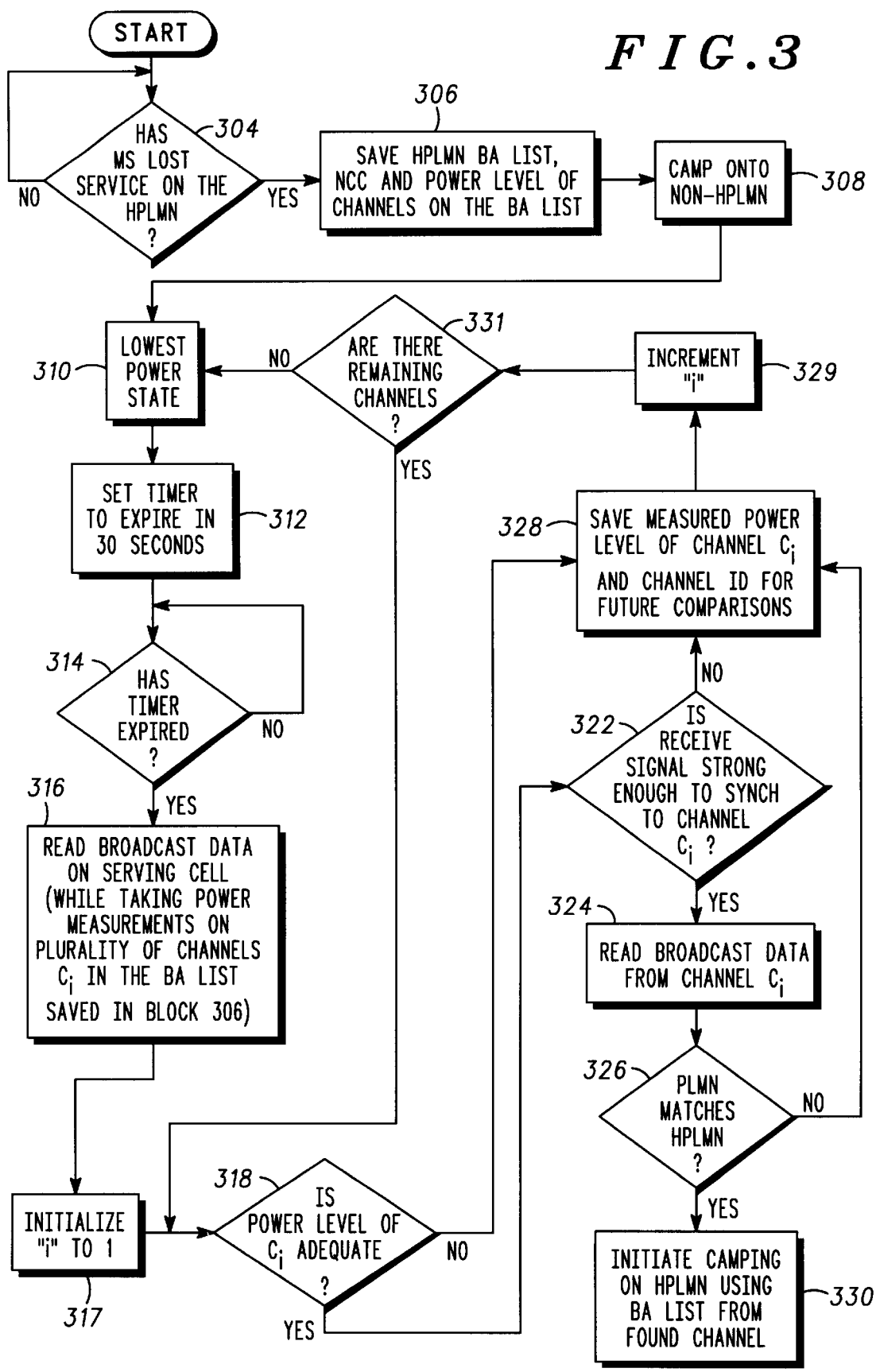
FIG. 3 is a flowchart of the preferred embodiment of the HPLMN search method of the present invention.

The method of the present invention is performed by the microprocessor 206 and is illustrated in FIG. 3. At the start of the method, the MS is camped onto the HPLMN. In decision block 304, the MS's microprocessor 206 checks to determine whether it has lost service on the HPLMN. If not, the microprocessor continues to check. If yes, the microprocessor 206 saves the HPLMN's broadcast allocation (BA) list, network color code (NCC) and power level of the channels on the BA list (block 306). Next, the microprocessor 206 camps onto a non-HPLMN (block 308) and places the MS 100 in its lowest power state or idle mode (block 310). When in idle mode, the MS 100 is required to read the broadcast data (or BCCH data) on the serving cell (channel that the MS 100 is currently camped on) every thirty seconds. This requirement is dictated by section 6.6.1 of the Digital cellular telecommunications system: Radio subsystem link control—GSM 5.08 specification. The broadcast data consists of a plurality of frames and includes data about a specific frequency (channel). The data can include, for example, reselection information, location area information (consisting of PLMN and location area), paging information, the BA list, the frequency correction burst (FCB), the synchronization channel (SCH) and the base station identity code (BSIC) which includes the NCC.

The reselection information includes cell reselection parameters. The parameters control the rate at which an MS is allowed to perform a reselection operation. A reselection operation occurs when the MS changes camp status from a first cell in a PLMN to a second cell in the same PLMN. The paging information includes parameters that instruct the MS when to listen to pages addressed to itself. The BA list for a particular channel includes the channel and channels of surrounding cells. The FCB is a specific tone broadcast so that the MS can obtain rough timing and accurate frequency information about a given cell. The SCH is used for fine timing adjustments, frame timing and simplified channel identification, i.e., BSIC.

Figure 4:
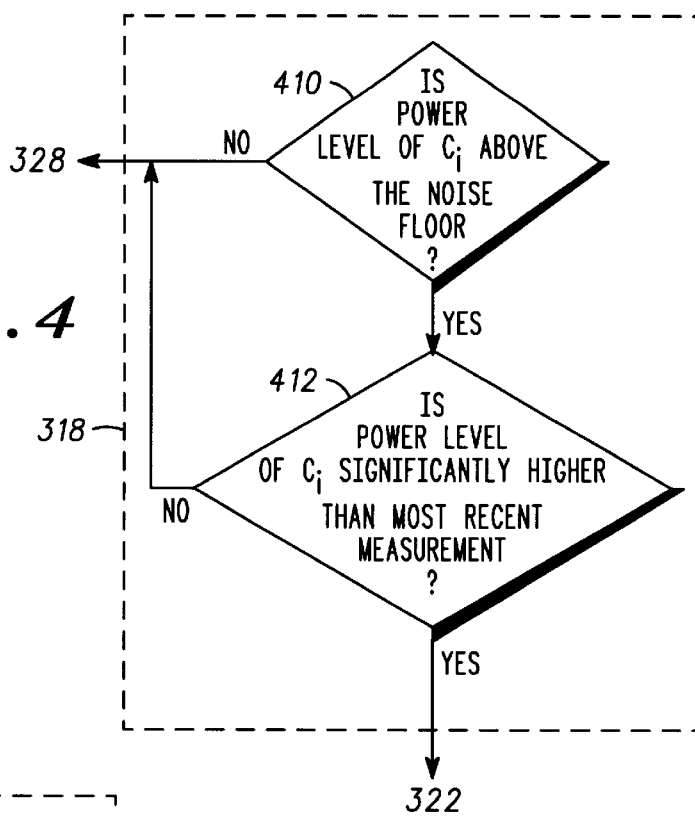
FIG. 4 is a flowchart of the preferred embodiment of decision block 318 of FIG. 3.

Referring back to FIG. 3, in block 312, the microprocessor 206 sets a timer to expire in thirty seconds. In decision block 314, the microprocessor 206 determines whether the timer has expired. If the timer has expired, the microprocessor 206 reads the broadcast data on the serving cell (block 316). Preferably, when the microprocessor 206 reads the broadcast data on the serving cell, it also simultaneously measures the power level of a plurality of channels $C_i$ (where i=1 to n) included in the BA list saved in block 306. In block 317, the microprocessor 206 initializes "i" to 1. In decision block 318, the microprocessor 206 determines whether the power level of channel $C_i$ (the first channel in the BA list) is adequate. Preferably, as shown in FIG. 4, this determination consists of checking whether the power level of $C_i$ is above the noise floor (decision block 410), and if so, checking whether the power level of $C_i$ is significantly higher than the channel's most recent measurement (decision block 412). In the preferred embodiment, the noise floor is −110 dBm and the receive level is significantly higher than the saved measurement if it is 5 dB higher. Referring to FIG. 3, if the power level of channel $C_i$ is adequate, the microprocessor 206 determines if the receive signal is strong enough to synchronize to channel $C_i$ (block 322). If the receive signal is strong enough to synchronize to channel $C_i$, the microprocessor 206 proceeds to block 324.

Figure 5:
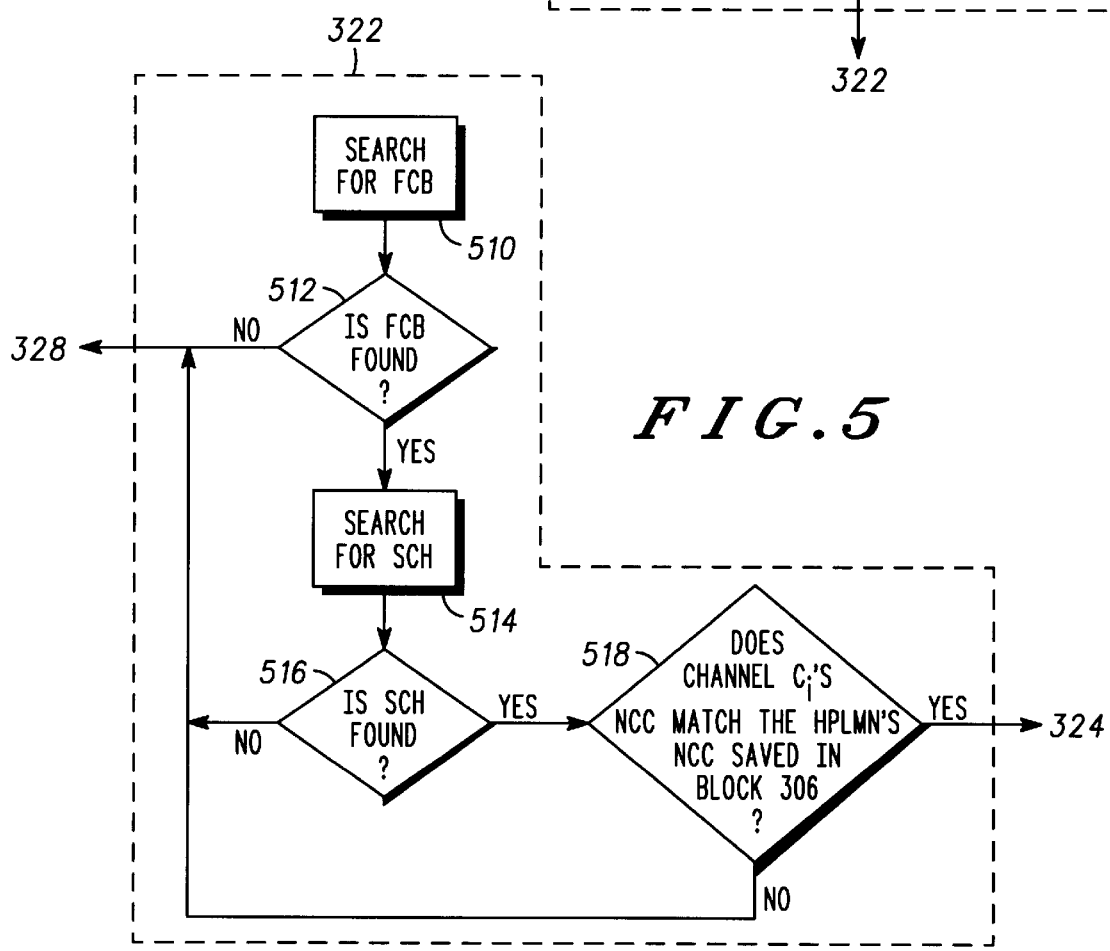
FIG. 5 is a flowchart of the preferred embodiment of block 322 of FIG. 3.
Figure 7:
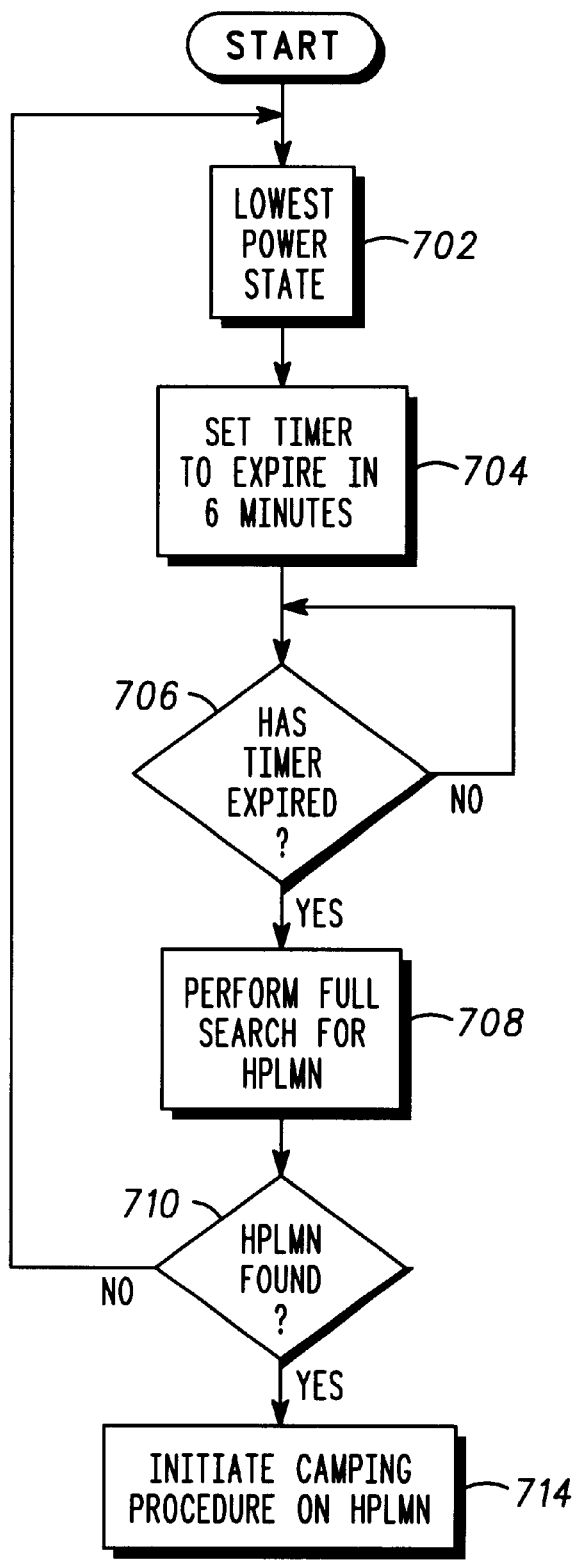
FIG. 7 is a flow chart of a known method of searching for an MS's HPLMN.

FIG. 5 illustrates the preferred embodiment of decision block 322 previously described. In block 510, the microprocessor 206 searches for the FCB. If the FCB is found (decision block 512), the microprocessor 206, in block 514, searches for the SCH. If the SCH is found (decision block 516), preferably the microprocessor 206 determines whether the channel's NCC matches the HPLMN's NCC saved in block 306 (decision block 518). If no, the microprocessor 206 proceeds to block 328 (FIG. 3). If yes, the microprocessor 206 proceeds to block 324 (FIG. 3) and reads broadcast data (including the PLMN and BA list) from channel $C_i$. In decision block 326, the microprocessor 206 determines whether the PLMN just read matches the HPLMN. If so, the microprocessor 206 initiates camping on the HPLMN using the BA list from channel $C_i$.

During the procedure described above, if the answer to any of decision blocks 318, 322, 326, 410, 412, 512, 516 or 518 is no, the microprocessor 206 saves the measured power level of channel $C_i$ and the channel identification for future comparisons (block 328). Next, in block 329, the microprocessor 206 increments "i" and determines whether there are any remaining channels for which power measurements were taken in step 316 (decision block 331). If so, the microprocessor 206 continues the process starting with step 318 for each of the remaining n channels until the HPLMN is found. If not, the microprocessor 206 returns the MS 100 to its lowest power state.

Figure 6:
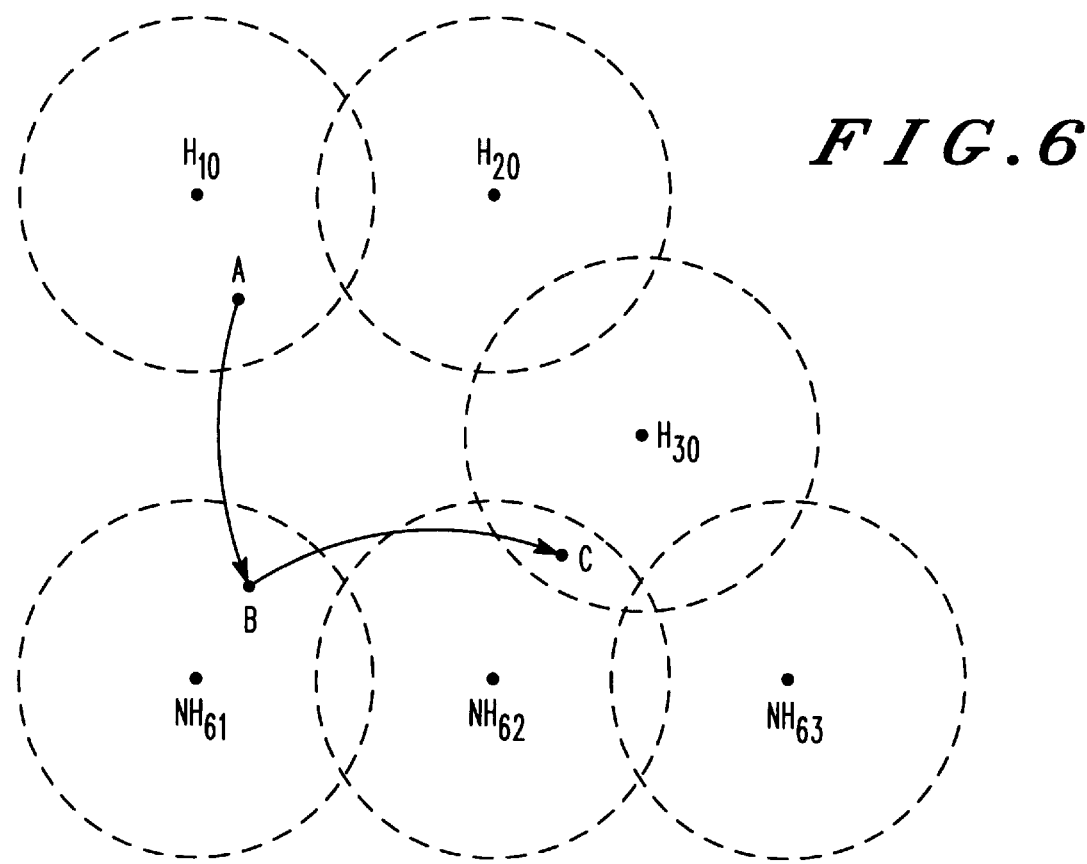
FIG. 6 is a pictorial representation of an MS moving between the HPLMN and a non-HPLMN.

FIG. 6 depicts an HPLMN (H) and a non-HPLMN (NH) coverage area for a given MS. In the present example, the HPLMN coverage area includes cells 10, 20 and 30. The non-HPLMN coverage area includes cells 61, 62 and 63. As long as the MS 100 remains in one of cells 10, 20 and 30, the MS 100 is able to make and receive calls using the HPLMN. When the MS 100 leaves the HPLMN coverage area and camps onto a non-HPLMN, the method of the present invention can be used to determine when the HPLMN has again become available so that camping procedures can be initiated.

In the example shown in FIG. 6, the MS starts out at point A in cell 10 of the HPLMN. When the MS is moved to point B in cell 61 of a non-HPLMN, the MS will detect that it has lost service on the HPLMN (FIG. 3, decision block 304), will save the HPLMN's BA list, NCC and power level of channels on the BA list (block 306), and camp on the non-HPLMN (block 308). After the MS is camped on the non-HPLMN, the microprocessor 206 returns the MS 100 to its lowest power state (block 310). Next, the microprocessor 206 will set the thirty second timer (block 312) to begin the process of reading broadcast data on the serving cell and looking for the HPLMN. When the timer expires, the microprocessor 206 will read the broadcast data on the serving cell (block 316). In the current example, the serving cell is cell 61. Preferably, while reading the broadcast data on cell 61, the microprocessor 206 will simultaneously look for the HPLMN by taking power level measurements on the plurality of channels $C_i$ included in the BA list saved in block 306. In the present example, the BA list saved in block 306 is the list for channel 10 which includes channel 10 and surrounding channels 20 and 30. In block 317, the microprocessor 206 initializes "i" to 1. Next, the microprocessor 206 determines whether the power level of channel $C_1$ (channel 10) is adequate. Preferably, if the power level of $C_1$ is above the noise floor and if $C_1$ has a power level measurement significantly higher than the most recent measurement (measurement saved in block 306), the microprocessor 206 proceeds with determining whether the received signal is strong enough to synchronize to channel $C_1$ (decision block 322). However, since the MS 100 has moved from the HPLMN in cell 10 to a non HPLMN in cell 61, the power measurement on channel 10 is not likely to be higher than the power level of the channel's most recent measurement. Thus, the microprocessor 206 will save the power level of channel $C_1$ and the channel ID for future comparisons (block 328) and increment "i" (block 329). Next, the microprocessor 206 will determine that there are remaining channels $C_2$ (channel 20) and $C_3$ (channel 30) and will repeat the process staring with block 318. Since the MS 100 is still in cell 61 of the non-HPLMN, the power measurements on $C_2$ and $C_3$ are not likely to be significantly higher than these channel's most recent measurements. The microprocessor 206 will save the power levels of channels $C_2$ and $C_3$ and the channel identifiers for future comparisons (block 328). Next, in block 310, the MS 100 will return to its lowest power state (since there are no remaining channels in the BA list for channel 10) and wait for the thirty second timer to expire to repeat the process starting from decision block 316.

In the present example, the MS 100 moves from cell 61 to point C and performs a reselection to cell 62 of the non-HPLMN. (As stated previously, a reselection occurs when the MS 100 moves from one channel to a different channel within the same PLMN.) Now, the MS 100 is camped on channel 62 of the non-HPLMN but is also within the HPLMN coverage area. When the thirty second timer expires, the microprocessor 206 reads the broadcast data on the serving cell, now cell 62, while simultaneously taking power level measurements on the plurality of channels $C_i$ included in the BA list saved in block 306 (block 316). Next, the microprocessor 206 initializes "i" to 1 (block 317). In block 318, the microprocessor 206 determines whether the power level measurement on channel $C_1$ (channel 10) is adequate. Since the MS 100 has moved to cell 30 (not 10) in the HPLMN, the power level measurement on channel 10 is not likely to be adequate (i.e., power measurement not likely to be significantly higher than the measurement saved in block 328 above). Thus, the microprocessor will save the measured power level of channel $C_1$ and the channel identifier for future comparisons (block 328). Next, the microprocessor will increment "i" (block 329), determine whether there are remaining channels to analyze (decision block 331) and repeat the process starting in block 318 for channel $C_2$. Again, the power level measurement on channel 20 is not likely to be adequate (i.e., power measurement not likely to be significantly higher than the measurement saved in block 328 above. Thus, the microprocessor will save the measured power level of channel $C_2$ and the channel identifier for future comparisons (block 328). Next, the microprocessor will increment "i" (block 329), determine whether there are remaining channels to analyze (decision block 331) and repeat the process starting in block 318 for channel $C_3$.

In block 318, the microprocessor 206 determines whether the power level is adequate. This time the power level of $C_3$ is likely to be significantly higher than the measurement saved in block 328 above since the MS 100 has moved to cell 30 in the HPLMN. Thus, the microprocessor 206 determines whether the receive signal is strong enough to synchronize to the channel (decision block 322). In the present example, the determination of whether the receive signal is strong enough to synchronize to the channel preferably includes searching for the FCB and the SCH of channel 30. If the receive signal is strong enough to synchronize to the channel, the microprocessor 206 reads broadcast data from channel $C_3$ which includes at least the PLMN and the BA list for the channel (block 324). If the receive signal is not strong enough to synchronize to the channel, the microprocessor 206 saves the power level measurement for channel $C_3$ and the channel identification for further comparisons and returns the MS 100 to its lowest power state (decision block 326). After reading the PLMN and BA list components of the broadcast data, the microprocessor 206 determines whether the PLMN just read matches the HPLMN. If there is a match, the microprocessor 206 initiates the camping procedure on the HPLMN using the BA list from channel 30 (block 330).

The method of the present invention provides advantages over known methods of searching for a MS's HPLMN. First, the method of the present invention searches for the HPLMN while the MS 100 is performing the required attempt to decode the broadcast data on the serving cell. Second, the method performs strategic signal level measurements on strong channels instead of every channel that the MS 100 is capable of accessing. Thus, the method of the present invention saves on current drain and efficiently utilizes the MS's resources. Third, since the method searches for the HPLMN in thirty second intervals instead of six minute intervals, for example, the HPLMN can be found much more quickly when it becomes available.

Those skilled in the art will recognize that various modifications and variations can be made in the apparatus of the present invention and in construction of this apparatus without departing from the scope or spirit of this invention.

What is claimed is:

1. In a mobile station, a method of searching for a home public land mobile network comprising the steps of:

storing home public land mobile network information including a home public land mobile network broadcast allocation list and a power level of each of a plurality of channels of the home public land mobile network broadcast allocation list upon losing service from the home public land mobile network;

measuring a receive power level of each of the plurality of channels of the home public land mobile network broadcast allocation list to produce a plurality of receive power level measurements;

for each of the plurality of channels of the home public land mobile network broadcast allocation list, until the home public land mobile network is found,
  determining whether the receive power level of the measured channel is adequate;
  determining whether the receive power level of the measured channel is strong enough to synchronize to the measured channel if the receive power level of the measured channel is adequate;
  reading broadcast data from the measured channel if the receive power level of the measured channel is strong enough to synchronize to the measured channel, wherein the broadcast data includes a public land mobile network and a public land mobile network broadcast allocation list;
  determining whether the public land mobile network identified in the broadcast data matches the home public land mobile network; and
  initiating camping on the home public land mobile network using the public land mobile network broadcast allocation list when the public land mobile network matches the home public land mobile network.

2. The method of claim 1 wherein the step of determining whether the receive power level of the measured channel is adequate comprises the steps of:
  determining whether the receive power level of the measured channel is greater than a noise floor; and
  determining whether the receive power level of the measured channel is significantly greater than a most recent power level of the measured channel when the receive power level of the measured channel is greater than the noise floor.

3. The method of claim 2 further comprising the step of storing the receive power level and an identifier of the measured channel when the receive power level of the measured channel is not greater than the noise floor.

4. The method of claim 2 further comprising the step of storing the receive power level and an identifier of the measured channel when the receive power level of the measured channel is not significantly greater than a most recent power level of the measured channel.

5. The method of claim 1 wherein the step of determining whether the receive power level of the measured channel is strong enough to synchronize to the measured channel comprises the steps of:
  searching for a frequency correction burst; and
  searching for a synchronization channel if the frequency correction burst is found.

6. The method of claim 5 wherein the home public land mobile network information further includes a network color code of the home public land mobile network.

7. The method of claim 6 wherein the broadcast data further includes a network color code of the public land mobile network.

8. The method of claim 7 further comprising the step of determining whether the network color code of the broadcast data of the measured channel matches the network color code of the home public land mobile network.

9. The method of claim 5 further comprising the step of storing the receive power level and an identifier of the measured channel when the frequency correction burst is not found.

10. The method of claim 5 further comprising the step of saving the receive power level and an identifier of the measured channel when the synchronization channel is not found.

11. The method of claim 1 further comprising the step of storing the receive power level and an identifier of the measured channel when the receive power level of the measured channel is not adequate.

12. The method of claim 1 further comprising the step of storing the receive power level and an identifier of the measured channel when the receive power level of the measured channel is not strong enough to synchronize to the channel.

13. The method of claim 1 further comprising the step of storing the receive power level and an identifier of the measured channel when the public land mobile network does not match the home public land mobile network.

* * * * *